United States Patent [19]

McColl et al.

[11] Patent Number: 4,499,005

[45] Date of Patent: Feb. 12, 1985

[54] INFRARED EMITTING PHOSPHOR

[75] Inventors: James R. McColl, Concord; Thomas E. Peters, Chelmsford, both of Mass.

[73] Assignee: GTE Laboratories Incorporated, Waltham, Mass.

[21] Appl. No.: 605,358

[22] Filed: Apr. 30, 1984

[51] Int. Cl.³ .............................................. C09K 11/06
[52] U.S. Cl. ......................... 252/301.6 S; 252/301.6 R
[58] Field of Search .................. 252/301.6 S, 301.6 R

[56] References Cited

U.S. PATENT DOCUMENTS

| B 381,709 | 7/1973 | Lipp | 252/301.6 R |
|---|---|---|---|
| 2,774,901 | 12/1956 | Sheldon | 252/301.6 R |
| 3,203,899 | 8/1965 | Fisher | 252/301.6 R |
| 3,459,667 | 8/1969 | Larach et al. | 252/301.6 |
| 3,785,991 | 1/1974 | Toshinai et al. | 253/301.6 R |
| 4,208,612 | 6/1980 | Hase et al. | 252/301.6 S |

OTHER PUBLICATIONS

Rothschild et al., Proc. Int. Conf. Sol. State Phys. 4, Pt. 2, (1958), p. 705.
Ibuki et al., J. Chem. Phys. 40, (1964), pp. 796–808.
Anderson et al., J. Chem. Phys. 43, (1965), pp. 1153–1160.
Anderson, J. Chem. Phys. 44, (1966), p. 3282.
Larach, Proc. Int. Conf. Lumin, (Budapest), 1966, p. 1549.
Schrader et al., J. Appl. Phys. 12, (1971), pp. 4529–4530.
Charreire et al., Mat. Res. Bull. 15, (1980), p. 657.

Primary Examiner—Arthur P. Demers
Attorney, Agent, or Firm—Ivan L. Ericson

[57] ABSTRACT

A ZnS:Tm,Ag cathodoluminescent phosphor composition is described. The phosphor emits in the infrared region at approximately 800 nm. The method of making this phosphor is also described. The ingredients are mixed, formed into a cake, dried, comminuted, heated at 800° C. followed by a 1180° C. firing and then cooled to room temperature. All the heating and cooling is done in a hydrogen sulfide atmosphere.

3 Claims, 3 Drawing Figures

INFRARED EMITTING PHOSPHOR

FIELD OF THE INVENTION

This invention relates to cathode ray tube phosphors. More particularly, this invention relates to an infrared emitting cathode ray tube phosphor.

BACKGROUND OF THE INVENTION

Zinc sulfide and (ZnCd)S activated with either Cu, Ag or Au and coactivated with either Cl, Al, Ga or In are well known as efficient photo and cathodoluminescent phosphors. Zinc and zinc-cadmium chalcogenide phosphors activated by the rare earth elements are also known. Luminescence from ZnS:Tm was described by S. Rothschild, Proc. Int. Conf. on Sol. State Phys. and Telecomm., 4, Pt. 2, 705 (1958), who found an emission manifold centered in the blue spectral region at 478 nm. Ibuki and Langer, J. Chem. Phys., 40, 796 (1964), also studied the fluorescence of ZnS:Tm and concluded that the $Tm^{3+}$ ion occupied a lattice site with Td symmetry. Anderson, S. Razi and D.J. Walsh, ibid, 43, 1153 (1965); W. W. Anderson, ibid, 44, 3282 (1966) investigated the fluorescence of a several rare earth ions in zinc and cadmium sulfide matrices and noted that the trivalent rare earth can associate with a variety of acceptor defects, and it thereby occupies a number of non-equivalent symmetry sites. Larach, Proc. Int. Conf. on Lumin., Budapest, 1966, 1549 (1968) extended the work of Rothschild and reported two additional emissions from ZnS:Tm, one centered at 645 nm and another at 775-800 nm, with about 20% of the total energy in the near infrared manifold. In a subsequent patent, Larach and Yocom (U.S. Pat. No. 3,459,969) of RCA Corp. detailed the preparation of luminescent materials consisting of the sulfide or sulfo-selenides of zinc and cadmium, containing between 0.001 to 1.0 mole percent of a rare earth element selected from the group consisting of Pr, Nd, Sm, Tb, Dy, Ho, Er, Tm and between 0.0001 and 1.0 mole percent of an alkali metal selected from a group consisting of Li, Na, K, Rb, Cs. These workers theorized that the function of the monovalent alkali metal was to provide charge compensation for the trivalent rare earth ion when it is substituted for divalent zinc or cadmium in the sulfo-selenide lattice. Although the exact function of the alkali metal was not understood it was found to be essential to the preparation of improved phosphors. Moreover, the function of the incorporated alkali was found to be different from that of the monovalent Ag, Cu and Au used in the prior art phosphors. In fact the earlier workers teach that Ag and Cu does not produce the advantages effect of the alkali metal. With Ag or Cu present it was found that a broad band emission typical of these ions accompanied the narrow emission bands of the rare earth in the cathodoluminescence spectra. Shrader, Larach and Yocom, J. Appl. Phys., 12, (1971) also measured the cathodoluminescence efficiency of ZnS:Tm and found it to be the highest reported for a rare-earth activated phosphor. These workers emphasized the unusual power distribution among the three emission manifolds that concentrates the major portion of the ZnS:Tm luminosity in a single narrow blue band.

Finally, in more recent work, Charreire et al., Mat. Res. Bull., 15, 657 (1980) conducted a detailed spectral study of the blue emitting $Tm^{3+}$ manifold and its relationship to the ZnS crystal structure. These workers concluded that the Td symmetry site occupied by the $Tm_{3+}$ ion is similar in all of the various ZnS structure types (Cubic, hexagonal and faulted) and is independent of charge compensation.

SUMMARY OF THE INVENTION

In accordance with one aspect of the present invention, there is provided an improved infrared emitting phosphor composition comprising thulium and silver coactivated zinc sulfide having the appropriate formula $$ZnS:Tm_xAg_y$$

wherein
  x is from about 100 to 1000 atomic parts per million.
  y is from about 10 to about 100 atomic parts per million.

In another aspect of the invention there is provided an improved method for making a thulium and silver coactivated zinc sulfide phosphor comprising the steps:

Step 1. Zinc sulfide powder is mixed with about 100 to about 1000 atomic parts per million thulium and about 10 to about 100 atomic parts per million silver in water to form a slurry;

Step 2. The water is removed from the slurry of step 1 by evaporation to form a dry cake;

Step 3. The dry cake from step 2 is comminuted to form a powder;

Step 4. The powder from step 3 is heated at a temperature of about 800° C. for about 30 minutes in a hydrogen sulfide atmosphere;

Step 5. The temperature of about 800° C. from step 4 is increased to about 1180° C. for about 30 minutes to form a reacted powder; and Step 6. The reacted powder from step 5 is cooled to room temperature in a hydrogen sulfide atmosphere.

For a better understanding of the present invention, together with other and further objects, advantages and capabilities thereof, reference is made to the following disclosure and appended claims in connection with the above-described drawing.

DETAILED DESCRIPTION OF THE PREFERRED EMBODIMENT

The present invention relates to a novel infrared emitting phosphor and a method of preparing the phosphor. It also relates to the use of this novel infrared emitting phosphor in devices which require a strong emission in spectral regions of low eye sensitivity. Such devices might include cathode ray tubes for interactive video displays or beam indexing. This phosphor might also find application in devices used for verification or validation purposes.

Figure 1:
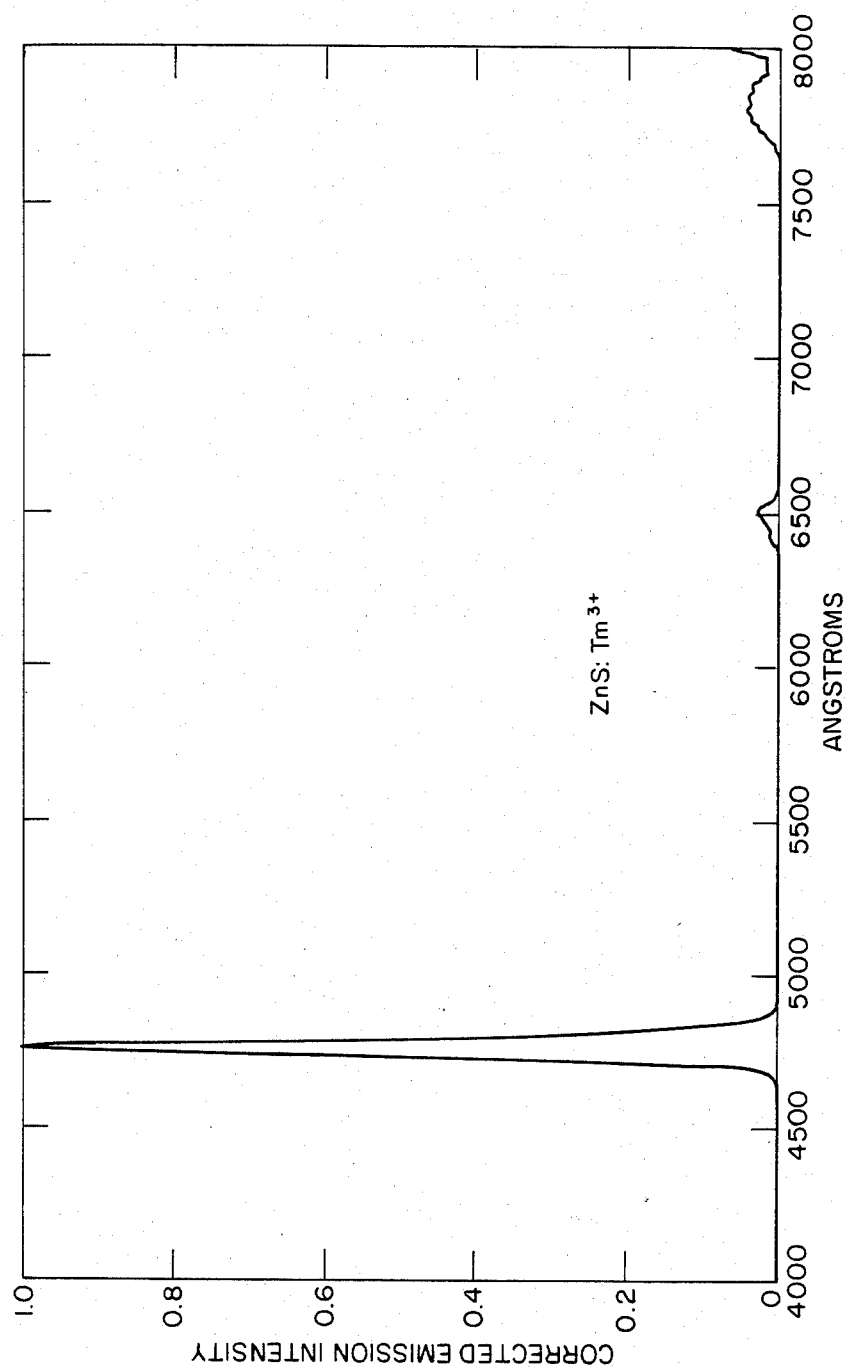
FIG. 1 shows a cathodoluminescence spectra of a ZnS: Na, Tm phosphor.
Figure 2:
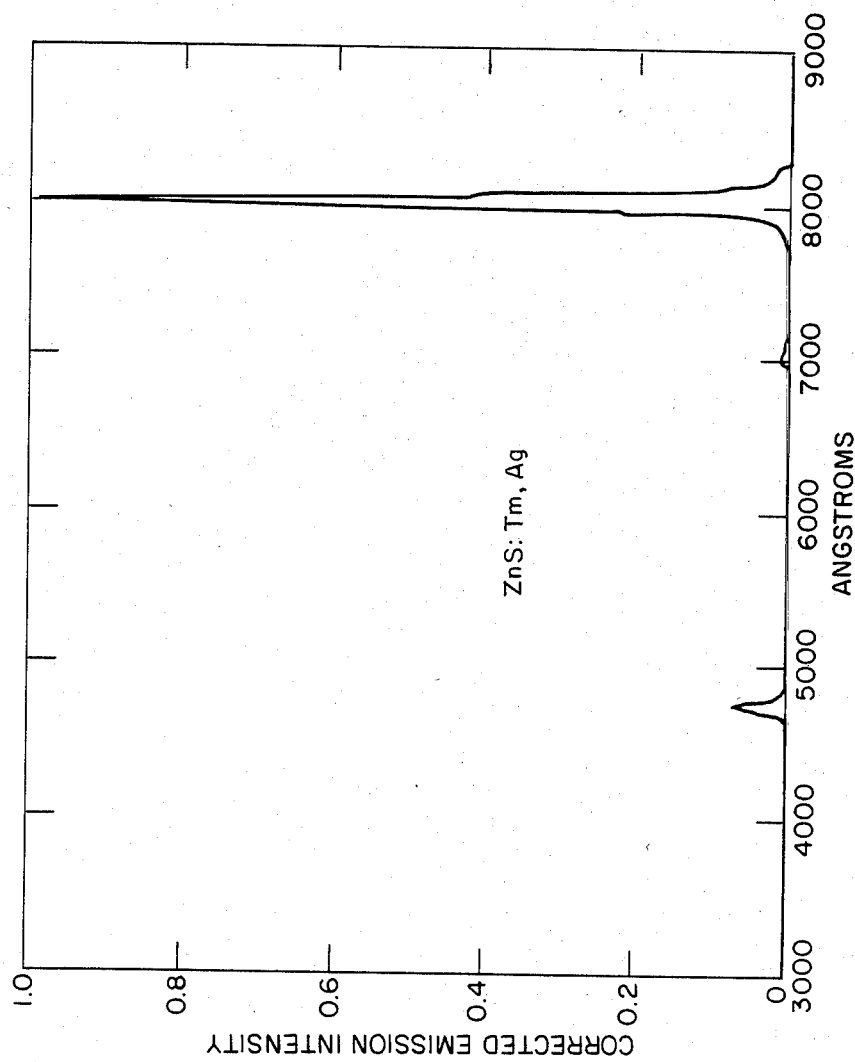
FIG. 2 shows a cathodoluminescence spectra of a ZnS: Tm, Ag phosphor in accordance with the present invention.
Figure 3:
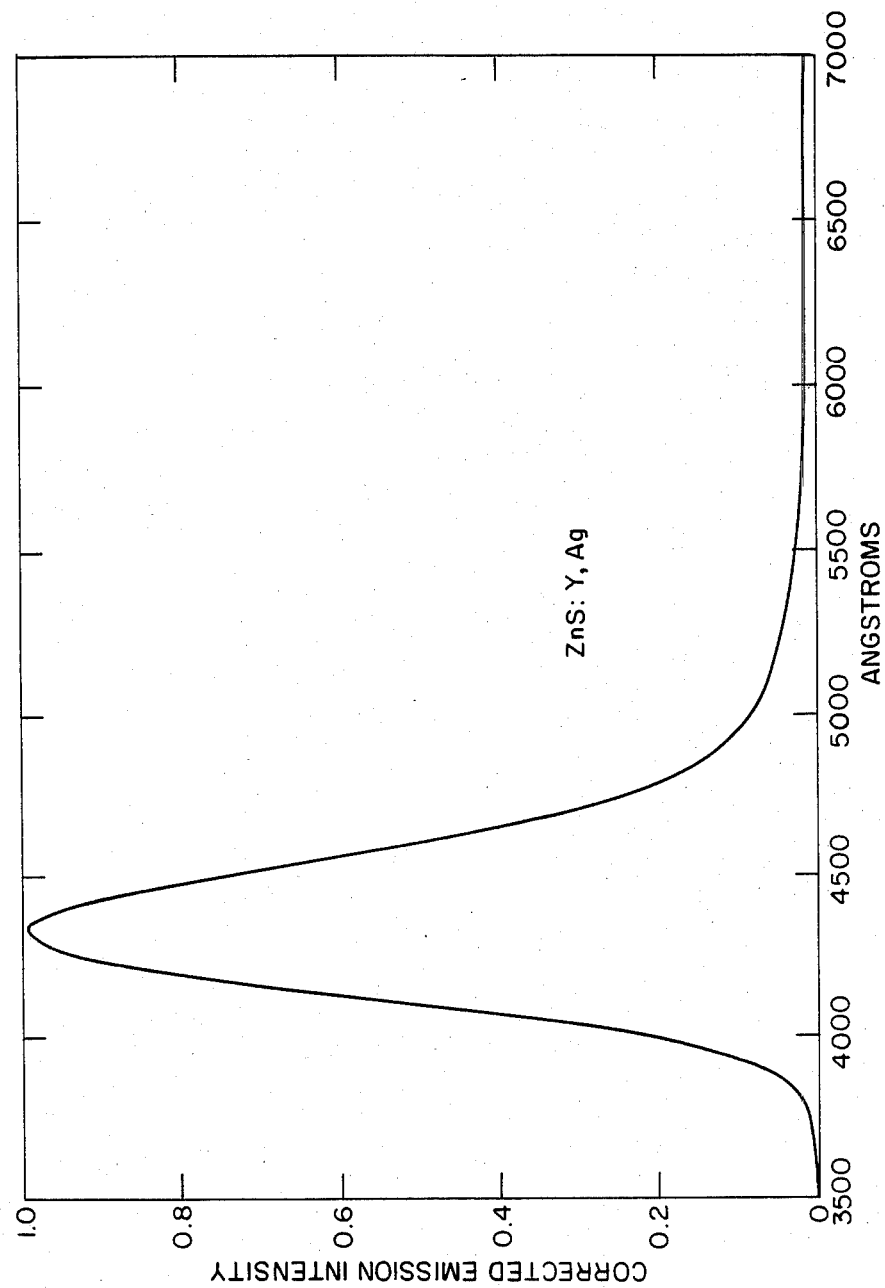
FIG. 3 shows a cathodoluminescence spectra of a Zns: Y, Ag phosphor.

The phosphor of the present invention is surprisingly different from that predicted from the teaching of Larach and Yocom. This is shown in the cathodoluminescence spectra in FIGS. 1 and 2 which were obtained from one of the phosphors of this invention and from a ZnS:Na;Tm phosphor prepared according to the teaching of Larach and Yocom. FIGS. 1, 2 and 3 are plotted in terms of corrected emission intensity versus wavelength in Angstroms. It can be seen in FIG. 2, that when silver is used in conjunction with thulium the predominant emission is no longer blue as it is for the ZnS:Na,Tm phosphor of FIG. 1. With silver coactivation the blue manifold in the cathodoluminescence spectrum is suppressed and the infrared manifold centered at about 8000 Angstroms or 800 nm is enhanced. Moreover, the thulium emission from the ZnS:Ag,Tm phosphor is not accompanied by the typical band emission of silver as taught by Larach and Yocom. The novel behavior of the ZnS:Ag,Tm phosphor with respect to the absence of the silver emission is further accentuated when its cathodoluminescence spectrum is compared to that of a similar phosphor in which yttrium has been substituted for thulium. The spectrum from this phosphor, as shown in FIG. 3, does exhibit the typical broad band emission of silver, thus further demonstrating the uniqueness of the silver, thulium activator combination in this host matrix. The wavelength scale spectrum in FIG. 3 is in Angstroms.

PREPARATION OF THE PHOSPHOR ACCORDING TO THE PRESENT INVENTION

A luminescent grade zinc sulfide, ZnS, that is essentially free of chlorine and other undesirable impurities is slurried with aliquots of water solutions containing the desired concentrations of thulium nitrate, $Tm(NO_3)_3$, and silver nitrate, $AgNO_3$, respectively. The liquid is removed by evaporation and the raw materials are comminuted, i.e., mortared and heated at 800° C. for 30 minutes in a hydrogen sulfide, $H_2S$ atmosphere. After the initial firing period has elapsed, the furnace temperature is increased to 1180° C. for an additional 30 minutes. Upon completion of the firing sequence, the furnace is turned off and the phosphor is allowed to cool in the furnace below red heat, then is removed from the furnace and allowed to cool to room temperature. The entire heating and cooling process is carried out in hydrogen sulfide. Best results seem to be obtained when the silver concentration is between 10–100 appm (atomic parts/million) and the thulium is between 100–1000 appm. Individual tests were run at 10 appm and 100 appm silver and 100 appm, 200 appm and 1000 appm thulium.

While there has been shown and described what is at present considered the preferred embodiment of the invention, it will be obvious to those skilled in the art that various changes and modifications may be made therein without departing from the scope of the invention as defined by the appended claims.

What is claimed is:

1. A luminescent composition comprising thulium and silver coactivated zinc sulfide having the approximate formula $$ZnS:Tm_xAg_y$$

wherein x is from about 100 to about 1000 atomic parts per million, y is from about 10 to about 100 atomic parts per million.

2. A method for making a thulium and silver coactivated zinc sulfide phosphor comprising the steps Step 1. mixing zinc sulfide powder with about 100 to about 1000 atomic parts per million thulium and about 10 to about 100 atomic parts per million silver in water to form a slurry;

Step 2. removing said water from said slurry of step 1 by evaporation to form a dry cake;

Step 3. comminuting said dry cake from step 2 to form a powder;

Step 4. heating said powder from step 3 at a temperature of about 800° C. for about 30 minutes in a hydrogen sulfide atmosphere;

Step 5. increasing said temperature of about 800° C. from step 4 to about 1180° C. for about 30 minutes to form a reacted powder; and Step 6. cooling said reacted powder from step 5 to room temperature in a hydrogen sulfide atmosphere.

3. A infrared emitting phosphor comprising a thulium and silver coactivated zinc sulfide phosphor emitting at about 800 nm.

* * * * *